(12) United States Patent
Deng (10) Patent No.: US 8,450,869 B2
(45) Date of Patent: May 28, 2013

(54) OCEAN WAVE POWER DEVICE

(75) Inventor: Zhihui Deng, Zhongshan (CN)

(73) Assignee: Zhongshan Fantasy Model Design Co., Ltd., Zhongshan (CN)

( * ) Notice: Subject to any disclaimer, the term of this patent is extended or adjusted under 35 U.S.C. 154(b) by 56 days.

(21) Appl. No.: 13/110,019

(22) Filed: May 18, 2011

(65) Prior Publication Data

US 2011/0215581 A1    Sep. 8, 2011

Related U.S. Application Data

(63) Continuation of application No. PCT/CN2009/074934, filed on Nov. 13, 2009.

(30) Foreign Application Priority Data

Nov. 21, 2008   (CN) .......................... 2008 1 0219431

(51) Int. Cl.
*F03B 13/14*    (2006.01)
(52) U.S. Cl.
USPC ......................................................... 290/53
(58) Field of Classification Search
USPC ..................................................... 290/43, 53
See application file for complete search history.

(56) References Cited

U.S. PATENT DOCUMENTS

| | | | | |
|---|---|---|---|---|
| 4,350,305 | A * | 9/1982 | van Hoorn | 241/46.017 |
| 4,447,740 | A * | 5/1984 | Heck | 290/53 |
| 5,383,801 | A * | 1/1995 | Chas | 440/5 |
| 6,849,963 | B2 * | 2/2005 | Grinsted et al. | 290/42 |
| 7,329,964 | B2 * | 2/2008 | Park | 290/54 |
| 7,878,734 | B2 * | 2/2011 | Bull et al. | 405/76 |
| 8,084,873 | B2 * | 12/2011 | Carter et al. | 290/42 |
| 2003/0227173 | A1 * | 12/2003 | Gorshkov | 290/53 |
| 2010/0109330 | A1 * | 5/2010 | De La Cruz Blazquez | 290/53 |

* cited by examiner

*Primary Examiner* — Michael Zarroli
(74) *Attorney, Agent, or Firm* — Matthias Scholl P.C.; Matthias Scholl (57) ABSTRACT

An ocean wave power device, including a floating body, an electric generator, multiple water wheels, and a hydraulic accelerator, the electric generator is fixed on the floating body, the rotating shaft is disposed between the hydraulic accelerator and the floating body, and capable of rotating with respect to the floating body and the hydraulic accelerator, the top of the rotating shaft passes through the floating body and is connected to a rotor of the electric generator, the bottom of the rotating shaft passes through the hydraulic accelerator and is fixedly connected to the water wheel, a water channel is disposed on the hydraulic accelerator, and operates to form high-speed flow whereby driving the water wheels to rotate in the same direction.

9 Claims, 10 Drawing Sheets

OCEAN WAVE POWER DEVICE

CROSS-REFERENCE TO RELATED APPLICATIONS

This application is a continuation of International Patent Application No. PCT/CN2009/074934 with an international filing date of Nov. 13, 2009, designating the United States, now pending, and further claims priority benefits to Chinese Patent Application No. 200810219431.1 filed on Nov. 21, 2008. The contents of all of the aforementioned applications, including any intervening amendments thereto, are incorporated herein by reference.

BACKGROUND OF THE INVENTION

1. Field of the Invention

The invention relates to an ocean wave power device.

2. Description of the Related Art

Since ocean power generation features no pollution and no consumption of fuel, how to use energy carried by ocean wave to generate power becomes a research objective of worldwide ocean engineering researchers. China has a continental coastline of approximately 18000 kilometers and a large number of islands, and features rich ocean energy. With flammable energy crises becoming more and more serious, research and innovation of ocean power generation is a profound and significant task.

In oceans, wave power generation is to use a wave power device to transform kinetic energy of wave into electric energy. To affectively absorb wave energy, design of operation modes of the wave power device is dependent on vibration of wave, and movement mechanism is stabilized whereby obtaining kinetic energy and generating power. Due to instability of wave, one kind of conventional power generation device is disposed on sea floor, and has problems such as a very complex power generation device, easy to be damaged due to sea-water corrosion and sea beat, short work time, high cost of construction and maintenance, and so on. Another kind of conventional power generation device floats on sea surface, and uses a water wheel to drive a motor rotor to alternatively rotate whereby generating power. During rotation of the motor rotor, a large part of energy is wasted, which makes this kind of motor have low transformation efficiency. At the same time, since the conventional water wheel is directly connected to the rotor of the electric generator via a transmission device, rotation speed of the water wheel is strictly limited by wave energy. To improve transformation efficiency, the only way is to increase size of the water wheel, which correspondingly increases that of a mechanism fit with the water wheel, and thus cost thereof, and is unbeneficial for development of wave power generation.

SUMMARY OF THE INVENTION

In view of the above-described problem, it is an objective of the invention to provide an ocean wave power device that is capable of addressing the above-mentioned problems.

To achieve the above objectives, in accordance with one embodiment of the invention, provided is an ocean wave power device, including a floating body, an electric generator, multiple water wheels, and a hydraulic accelerator, the electric generator is fixed on the floating body, the rotating shaft is disposed between the hydraulic accelerator and the floating body, and capable of rotating with respect to the floating body and the hydraulic accelerator, the top of the rotating shaft passes through the floating body and is connected to a rotor of the electric generator, the bottom of the rotating shaft passes through the hydraulic accelerator and is fixedly connected to the water wheel, a water channel is disposed on the hydraulic accelerator, and operates to form high-speed flow whereby driving the water wheels to rotate in the same direction.

In a class of this embodiment, the water channel is helical, and inner diameter of the water channel gradually reduces from an inlet end to an outlet end thereof.

In a class of this embodiment, the hydraulic accelerator is disposed above the water wheel, the inlet end of the water channel forms a water inlet on upper end surface of the hydraulic accelerator, the outlet end of the water channel forms a water outlet on lower end surface of the hydraulic accelerator, the water outlet deviates from the center of the hydraulic accelerator, and the water inlet is much bigger than the water outlet.

In a class of this embodiment, a second hydraulic accelerator is disposed below the water wheel, the bottom of the rotating shaft extends downwards and passes through the second hydraulic accelerator, and a channel is disposed on the second hydraulic accelerator and operates to form high-speed flow whereby driving the water wheels to rotate in the same direction.

In a class of this embodiment, the channel is helical, inner diameter of the channel gradually reduces from an inlet end to an outlet end thereof, an inlet end of the channel forms a second water inlet on lower end surface of the second hydraulic accelerator, an outlet end of the channel forms a second water outlet on upper end surface of the second hydraulic accelerator, the second water outlet deviates from the center of the second hydraulic accelerator, and the second water inlet is much larger than the second water outlet.

In a class of this embodiment, the rotating shaft is rotably connected to the hydraulic accelerator and the second hydraulic accelerator, a positioning bulge is disposed on the rotating shaft and operates to prevent the hydraulic accelerator and the second hydraulic accelerator from axially moving, and a pair of stop plates is disposed on periphery of the hydraulic accelerator and the second hydraulic accelerator, and operates to prevent rotation thereof.

In a class of this embodiment, a water receiver with an upward opening is disposed at the bottom of the floating body, the water receiver is fixedly connected to the floating body, a vertical plate is disposed on periphery of the water receiver, the rotating shaft passes through the hydraulic accelerator and the second hydraulic accelerator, and is capable of rotating, and the hydraulic accelerator and the second hydraulic accelerator are fixedly connected to the water receiver via a connecting sheet.

In a class of this embodiment, the floating body floats on water surface, the floating body comprises an upper clamping plate, a lower clamping plate, and a floating pan disposed between the upper clamping plate and the lower clamping plate, the upper clamping plate, the lower clamping plate, and the floating pan are fixedly connected altogether, multiple connecting plates are disposed at the bottom of the lower clamping plate, and the bottom of the connecting plate is fixedly connected to the bottom of the water receiver.

In a class of this embodiment, multiple blades are uniformly distributed on periphery of the water wheel, and the blade is a smooth and arc-shaped sheet.

Advantages of the invention comprise:

1. the water wheel is fixed to the rotating shaft, as the water wheel ascends along with ocean wave, high-speed and downward water flow is formed in the hydraulic accelerator above the water wheel and drives the water wheel to rotate in a clockwise direction; as the water wheel descends along with ocean wave, high-speed and upward water flow is formed in the second hydraulic accelerator blow the water wheel and drives the water wheel to rotate in the same direction, whereby compensating for energy loss caused by different rotating directions as the water wheels ascends and descends. The water channel on the hydraulic accelerator, and the channel on the second hydraulic accelerator are helical, and inner diameter thereof gradually reduces from the inlet end to the outlet end, since inflow and outflow passing through the hydraulic accelerators as they move upwards and downwards is the same, flow speed of the water outlet is higher than that of the water inlet, which greatly increases force as water flow impacts the water wheel, and thus improving transformation efficiency of the invention.

2. the water receiver with the upward opening is disposed at the bottom of the floating body, as the floating body and the water receiver ascends along with wave, upward floating force is applied on the floating body, and the hydraulic accelerator quickly moves upwards in a static water layer and drives the water wheel to rotate in a clockwise direction whereby generating power. As ocean wave reaches a wave peak, since the water wheel applies counterforce to the floating body and the water receiver, the floating body and the water receiver do not simultaneously descend along with ocean wave, at this time, potential energy of water in the water receiver is transformed into kinetic energy of the second hydraulic accelerator for moving downwards, which improves power generating efficiency.

3. two or more water channels are disposed on the hydraulic accelerator, and two or more channels are disposed on the second hydraulic accelerator whereby further improving transformation efficiency; except for adding the water channels or the channels, multiple groups of hydraulic accelerators are disposed at the bottom of the rotating shaft at a certain interval. Power generating mechanism formed by the water wheel and the second hydraulic accelerator greatly improves transformation efficiency of the invention.

4. Since the floating body floats on water, and the rotating shaft and the electric generator are vertically disposed, the water wheel, hydraulic accelerator and the second hydraulic accelerator supplying power are below the sea level, and the electric generator floats above the sea level, which prevents the electric generator and installation components thereof from being corroded by sea water, and increases work life thereof.

BRIEF DESCRIPTION OF THE DRAWINGS

Further description will be given below in conjunction with accompanying drawings and specific embodiments.

DETAILED DESCRIPTION OF THE EMBODIMENTS

As shown in FIGS. 1-7, an ocean wave power device of the invention comprises a floating body 2, an electric generator 3, a water wheel 4, and a hydraulic accelerator 5. The electric generator 3 is fixed on the floating body 2, a water receiver 8 with an upward opening is disposed at the bottom of the floating body 2, the water receiver 8 is fixedly connected to the floating body 2, a vertical plate 81 is disposed on periphery of the water receiver 8 and operates to prevent rotation thereof. A rotating shaft 1 capable of rotating with respect to the floating body 2 and the hydraulic accelerator 5 is disposed between the hydraulic accelerator 5 and the floating body 2, the top of the rotating shaft 1 passes through the floating body 2 and is connected to a rotor of the electric generator 3, the bottom of the rotating shaft 1 passes through the hydraulic accelerator 5 and is fixedly connected to the water wheel 4, a water channel 51 is disposed on the hydraulic accelerator 5, and operates to form high-speed flow whereby driving the water wheels 4 to rotate in the same direction. As the water wheel 4 drives the electric generator 3 to generate power via the rotating shaft 1, driving force having the same direction as that of rotation of the rotating shaft 1 is applied to the electric generator 3, since the vertical plate 81 disposed on periphery of the water receiver 8 is immersed in sea water, the driving force applied to the electric generator 3 is transferred to the water receiver 8. Since rotation of the vertical plate 81 needs to overcome resistance of sea water, rotating resistance of the vertical plate 81 is designed to be far greater than driving force applied to the electric generator 3 during power generation, which ensures a base 30 does not rotate as the electric generator 3 generates power.

Figure 1:
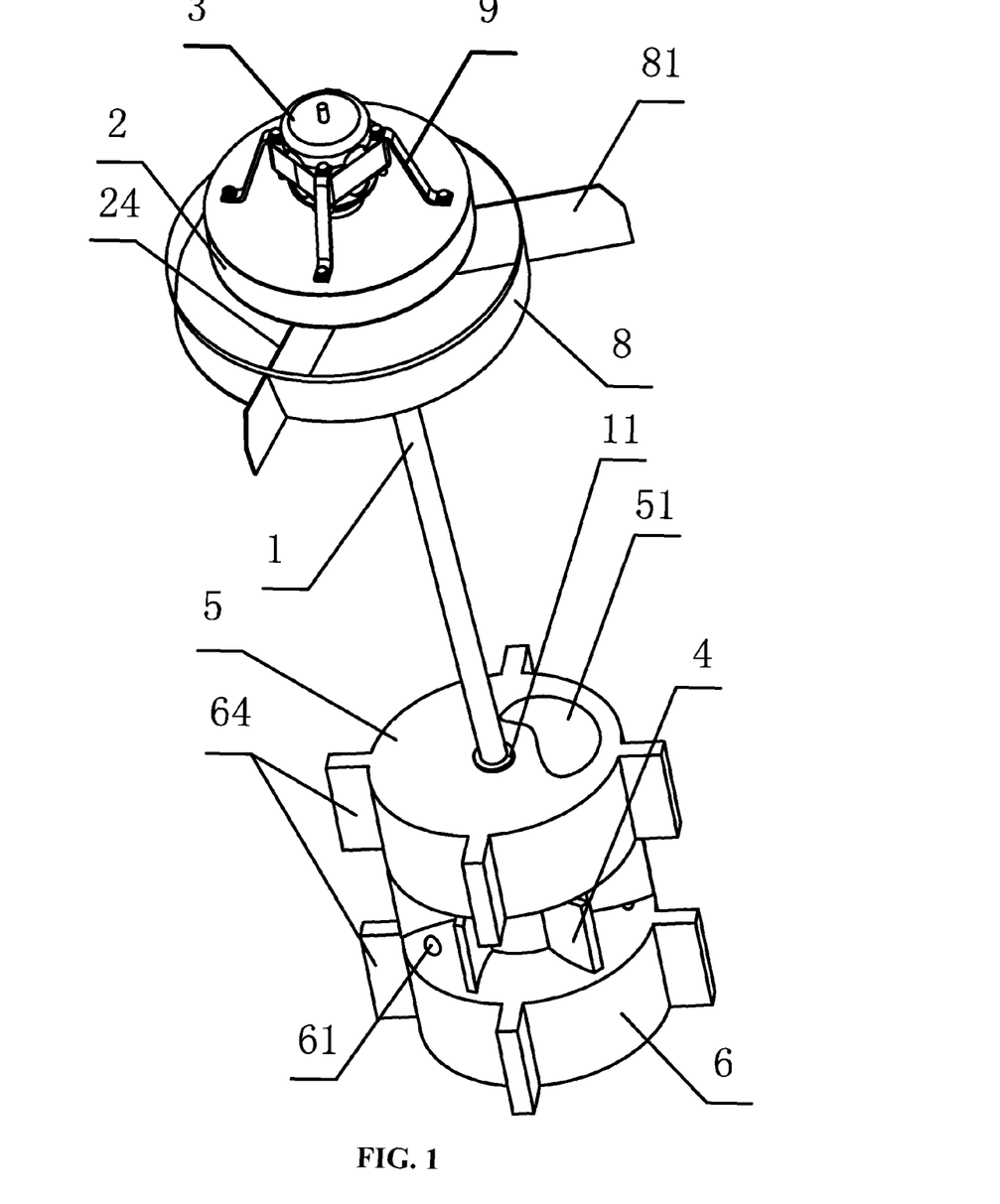
FIG. 1 is a schematic view of a first embodiment of the invention.
Figure 3:
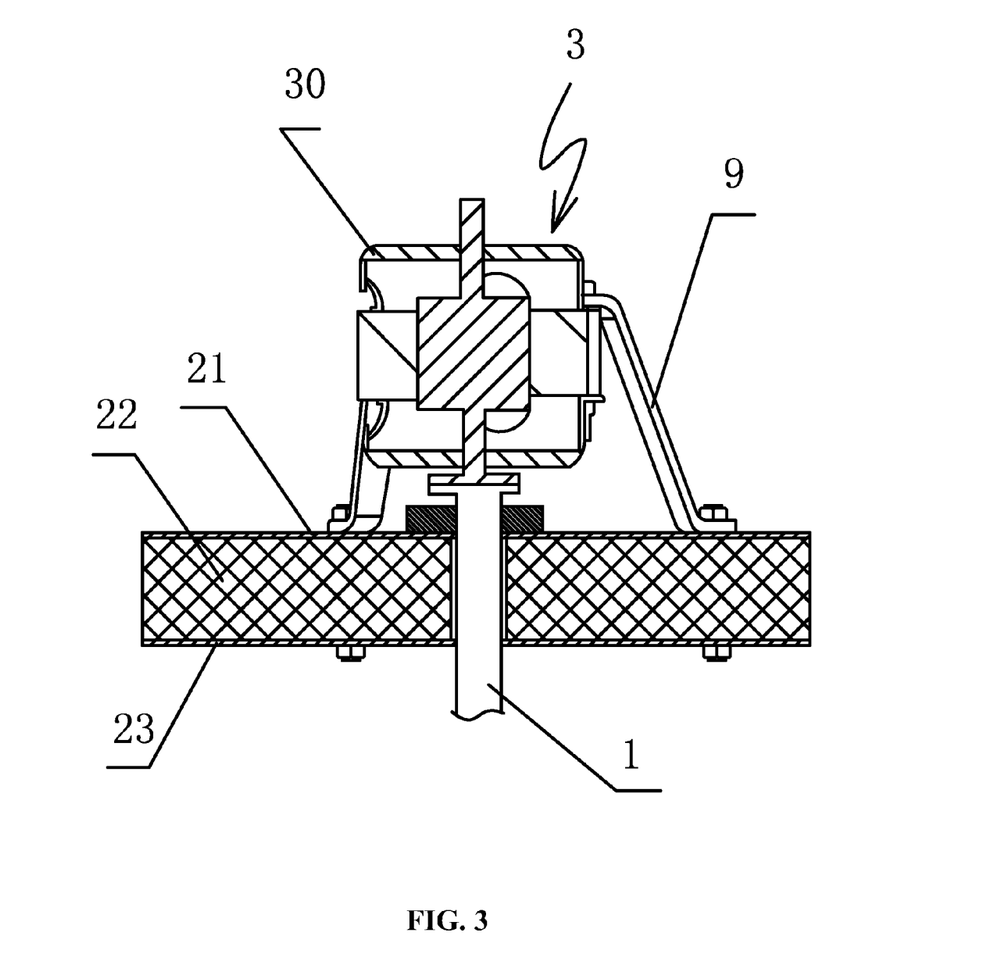
FIG. 3 is a cross-sectional view of an electric generator, a rotating shaft, and a floating body of the first embodiment of the invention.

In this invention, the rotating shaft 1 is a long rod that is vertically disposed, and the hydraulic accelerator 5 is a cylinder that is vertically disposed. The floating body 2 is big enough so that it always floats on water surface during the wave process. The floating body 2 comprises an upper clamping plate 21, a lower clamping plate 23, and a floating pan 22 disposed therebetween. The upper clamping plate 21 and the lower clamping plate 23, and the floating pan 22 are fixedly connected altogether. Multiple connecting plates 24 are disposed at the bottom of the lower clamping plate 23, and the bottom of the connecting plate 24 is fixedly connected to the bottom of the water receiver 8. A bracket 9 is disposed at the top of the upper clamping plate 21 of the floating body 2, one end of the bracket 9 is fixedly connected to the upper clamping plate 21, and the other end of the bracket 9 is fixedly connected to the base 30 of the electric generator 3.

Figure 4:
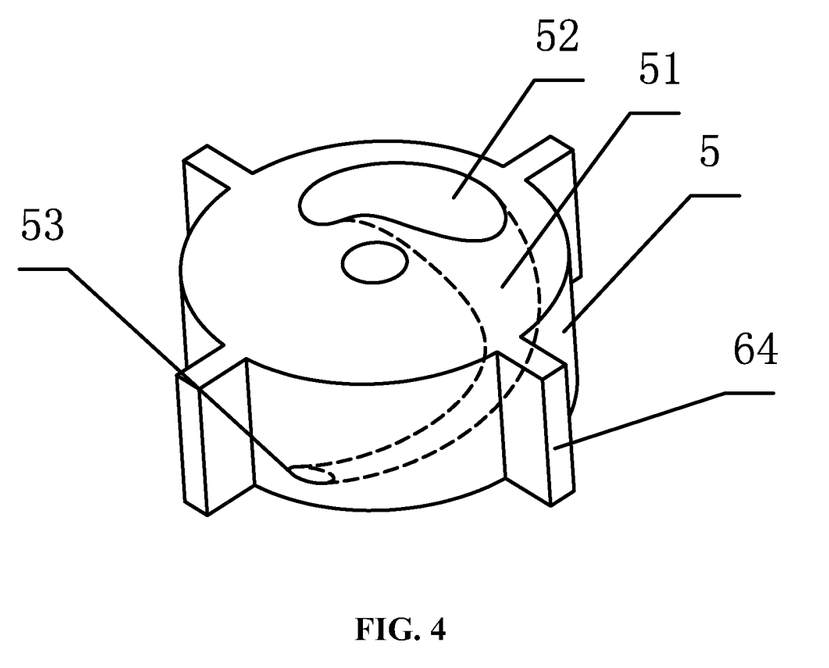
FIG. 4 is a schematic view of a hydraulic accelerator of the first embodiment of the invention.
Figure 6:
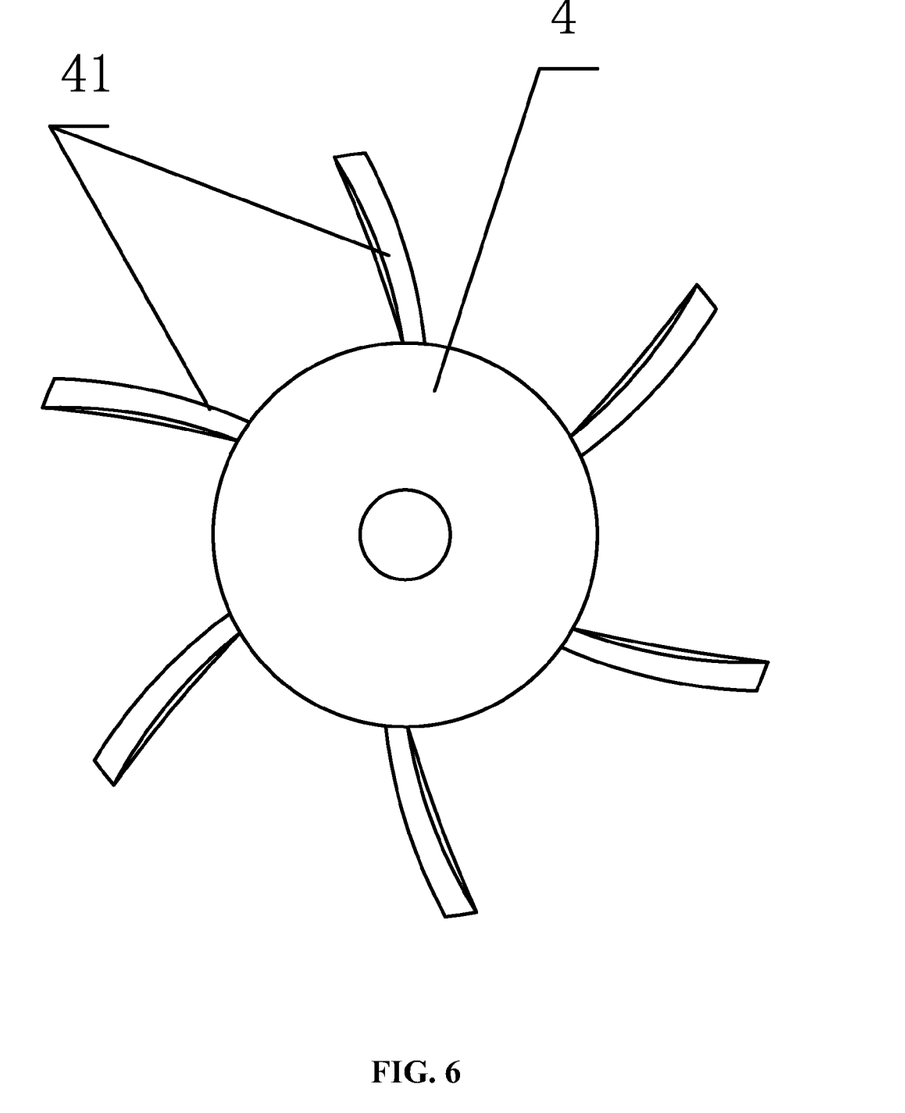
FIG. 6 is a front view of a water wheel of the first embodiment of the invention.

Multiple blades 41 are uniformly distributed on periphery of the water wheel 4, and the blade 41 is smooth and arc-shaped sheet. The hydraulic accelerator 5 is disposed above the water wheel 4, the water channel 51 is helical, and inner diameter of the water channel 51 gradually reduces from an inlet end to an outlet end thereof. An inlet end of the water channel 51 forms a water inlet 52 on upper end surface of the hydraulic accelerator 5, and an outlet end of the water channel 51 forms a water outlet 53 on lower end surface of the hydraulic accelerator 5. The water outlet 53 deviates from the center of the hydraulic accelerator 5, and the water inlet 52 is much bigger than the water outlet 53. Since the water inlet 52 is much bigger than the water outlet 53, and inner diameter of the water channel 51 gradually reduces, sea water in the water channel 51 forms high-speed water flow at the water outlet 53, which impacts the blade 41 of the water wheel 4, and drives the rotating shaft 1 to rotate in a clockwise direction whereby generating power. To obtain high-velocity water flow, area of the water inlet 52 is far larger than that of the water outlet 53, for example, 3-10 times or higher.

Figure 5:
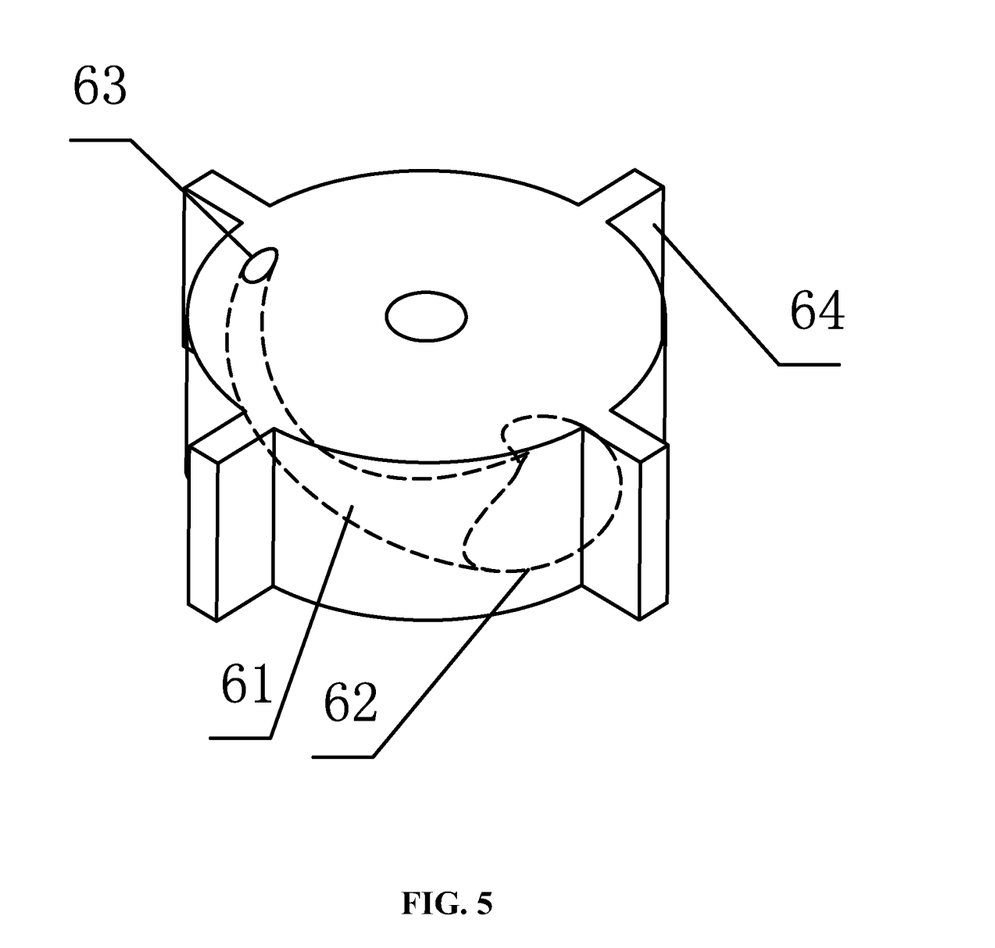
FIG. 5 is a schematic view of a second hydraulic accelerator of the first embodiment of the invention.

A second hydraulic accelerator 6 is disposed below the water wheel 4, the bottom of the rotating shaft 1 extends downwards and passes through the second hydraulic accelerator 6, and a channel 61 is disposed on the second hydraulic accelerator 6 and operates to form high-speed flow whereby driving the water wheels 4 to rotate in the same direction. The channel 61 is helical, inner diameter of the channel 61 gradually reduces from an inlet end to an outlet end thereof, an inlet end of the channel 61 forms a second water inlet 62 on lower end surface of the second hydraulic accelerator 6, an outlet end of the channel 61 forms a second water outlet 63 on upper end surface of the second hydraulic accelerator 6, the second water outlet 63 deviates from the center of the second hydraulic accelerator 6, and the second water inlet 62 is much larger than the second water outlet 63. Since the second water inlet 62 is much bigger than the second water outlet 63, and inner diameter of the water channel 61 gradually reduces, sea water in the water channel 61 forms high-speed water flow at the second water outlet 63, which impacts the blade 41 of the water wheel 4, and drives the rotating shaft 1 to rotate in a clockwise direction whereby generating power. To obtain high-velocity water flow, area of the second water inlet 62 is far larger than that of the second water outlet 63, for example, 3-10 times or higher.

As shown in FIGS. 1-7, in a first embodiment of the invention, a water channel 51 is disposed on the hydraulic accelerator 5, and a channel 61 is disposed on the second hydraulic accelerator 6. The rotating shaft 1 is rotably connected to the hydraulic accelerator 5 and the second hydraulic accelerator 6, a positioning bulge 11 is disposed on the rotating shaft 1 and operates to prevent the hydraulic accelerator 5 and the second hydraulic accelerator 6 from axially moving. Thus, during operation, the rotating shaft 1 can rotate with respect to the hydraulic accelerator 5 and the second hydraulic accelerator 6, and at the same time, drive the hydraulic accelerator 5 and the second hydraulic accelerator 6 to move upwards and downwards. A pair of stop plates 64 is disposed on periphery of the hydraulic accelerator 5 and the second hydraulic accelerator 6, and operates to prevent then from rotating. Functions of the stop plate 64 is to overcome counterforce applied by high-speed water flow formed in the hydraulic accelerator 5 and the second hydraulic accelerator 6, and to prevent rotation of the hydraulic accelerator 5 and the second hydraulic accelerator 6 from affecting transformation efficiency.

Figure 7:
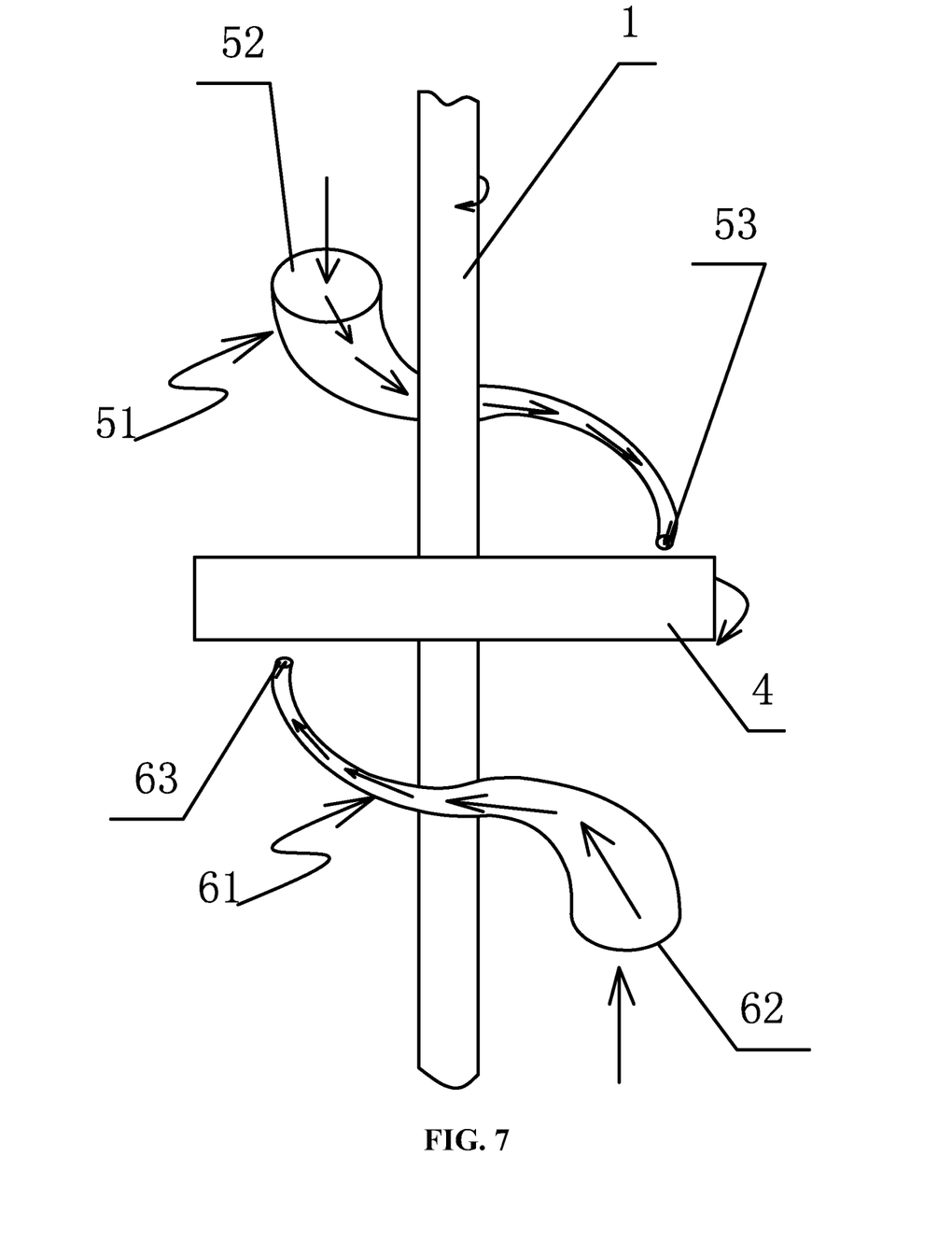
FIG. 7 is a diagram illustrating operation principle of the first embodiment of the invention.

Operation principle of the first embodiment of the invention is as follows:

In the first phase, as the floating body 2 moves upwards along with wave, the water wheel 4 ascends on the static water layer, sea water flows through the water inlet 52, the water channel 51 and the water outlet 53 on the hydraulic accelerator 5, and then forms high-speed water flow, which is much faster than that at the water inlet 52, at the water outlet 53. The high-speed water flow impacts the water wheel 4 and drives the rotating shaft 1 to rotate in a clockwise direction, thus first-phase power generation is implemented. At this time, the second hydraulic accelerator 6 is in an idle state. During ascending, upward movement of the floating body 2 is non-uniform motion. Upon reaching a wave peak, the hydraulic accelerator 5 stops moving upwards on the static water layer, the water wheel 4 continues rotating due to inertia. At this time, the rotating shaft 1 continues rotating. Then, under the action of gravity, the floating body 2, the water receiver 8 therebelow, and sea water in the water receiver 8 enters the second phase with descending of wave.

In the second phase, the hydraulic accelerator 5 is in an idle state. Sea water flows through the second water inlet 62, the channel 61, and the second water outlet 63 on the second hydraulic accelerator 6, and then forms high-speed water flow, which is much faster than that at the second water inlet 62, at the second water outlet 63. The high-speed water flow impacts the water wheel 4 and drives the rotating shaft 1 to rotate in a clockwise direction, thus second-phase power generation is implemented. During descending, downward movement of the floating body 2 is non-uniform motion. Upon reaching a wave trough, the second hydraulic accelerator 6 stops moving downwards on the static water layer, the water wheel 4 continues rotating due to inertia. After that, the invention ascends again along with wave, and periodic power generation is implemented. To summarize, the rotating shaft 1 always rotates in a clockwise direction during ascending and descending of the invention, and thus preventing energy loss caused by forward and reverse rotation of the rotating shaft 1.

Figure 2:
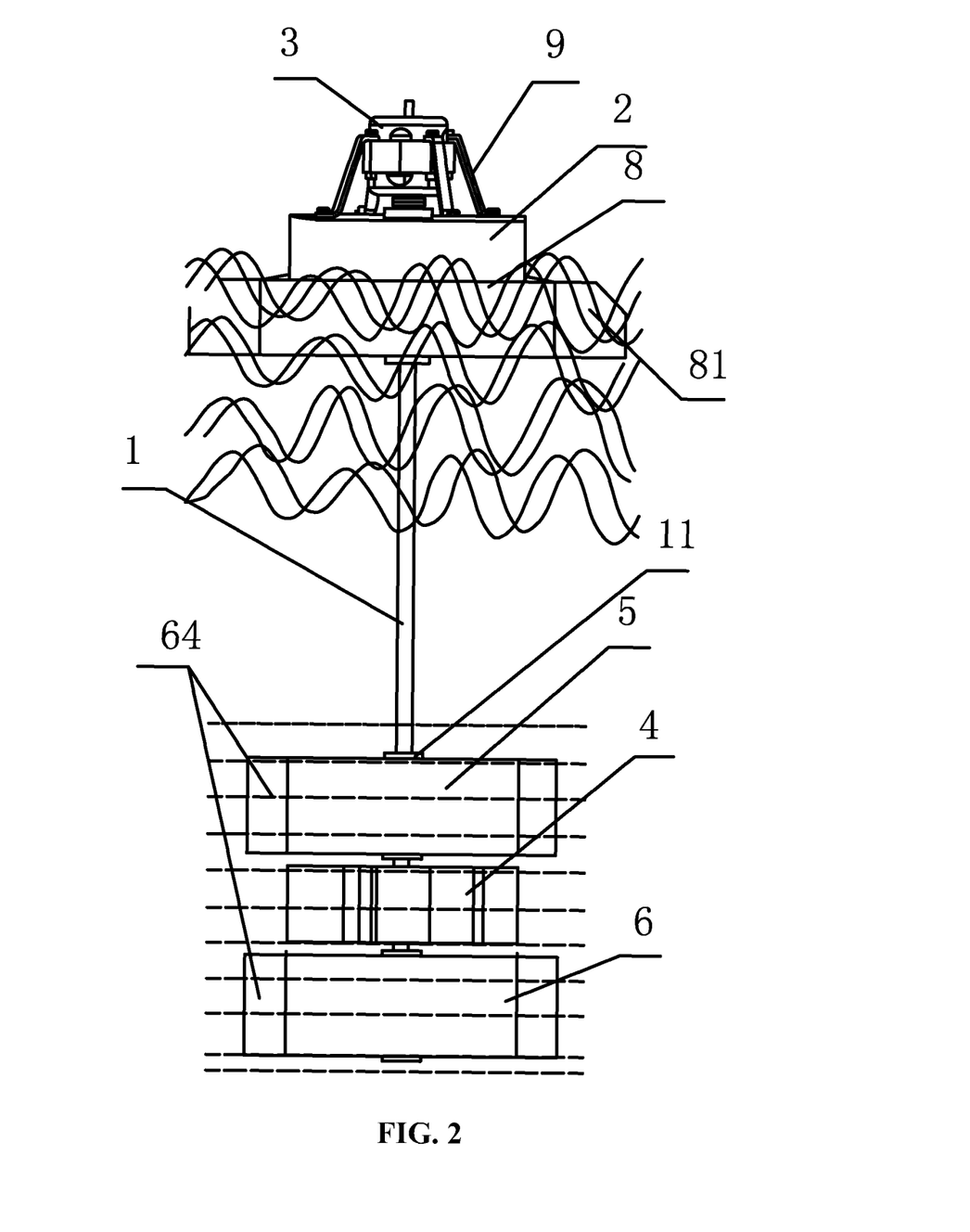
FIG. 2 illustrates the first embodiment used in an ocean.

As the invention operates in an ocean, substance in near surface at certain depth of sea water floats along with wave, and is referred to wave layer. At certain depth below sea water where water is in a static state, it is referred to as a static water layer. In use, the floating body 2 is above the sea level and on the wave layer, and the floating body 2 floats upwards and downwards along with wave. The water wheel 4, the hydraulic accelerator 5, and the second hydraulic accelerator 6 are in the static water layer. Thus, the invention makes use of wave motion of sea water and transforms wave energy into mechanical kinetic energy, and then mechanical kinetic energy into electric energy. Since the floating body 2 floats on water, the rotating shaft 1 and the electric generator 3 are vertically disposed, the water wheel 4, the hydraulic accelerator 5, and the second hydraulic accelerator 6 supplying power are below the sea level, and the electric generator 3 floats on the sea level, all these prevent the electric generator 3 and installation components thereof from being corroded by sea water, and increase work life thereof.

In practice, the rotating shaft 1 can keep rotating in a clockwise direction, and it is possible to implement rotation of the rotating shaft 1 in a counterclockwise direction by changing helical direction of the water channel 51 or the channel 61, and operation principles of both are the same. In use, after multiple ocean wave power devices are disposed on sea surface with certain area, electric quantity generated by all devices are collected and transmitted to a shore for further quality processing, and collection of electric power of all devices can be done via a floating frame. As for collection of electric power, it is possible that electric power of each device is processed and then collected, or electric power of all devices is collected and then processed, or sea water nearby is ionized whereby generating hydrogen, and then the hydrogen is transferred to the shore for use.

Figure 8:
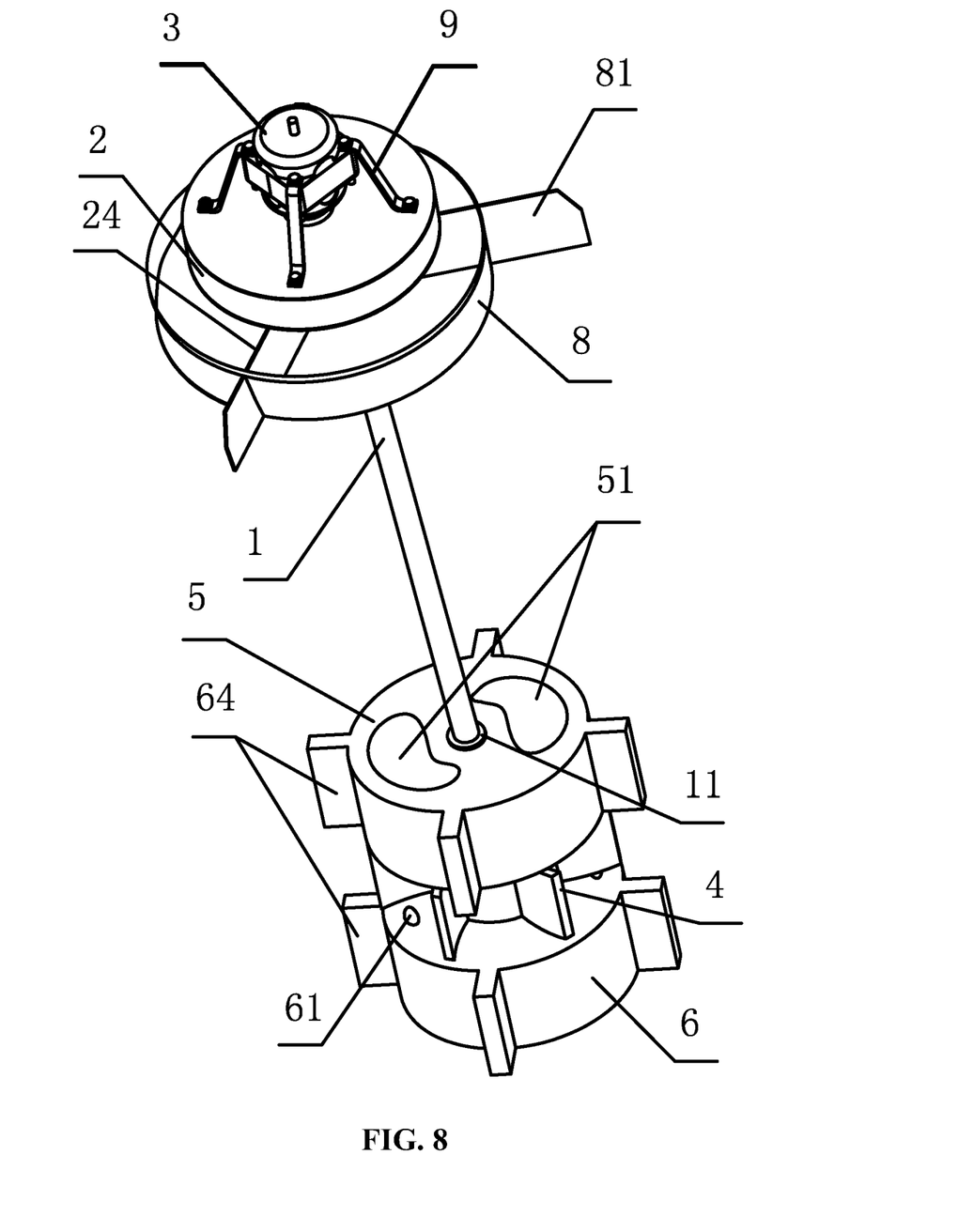
FIG. 8 is a schematic view of a second embodiment of the invention.
Figure 9:
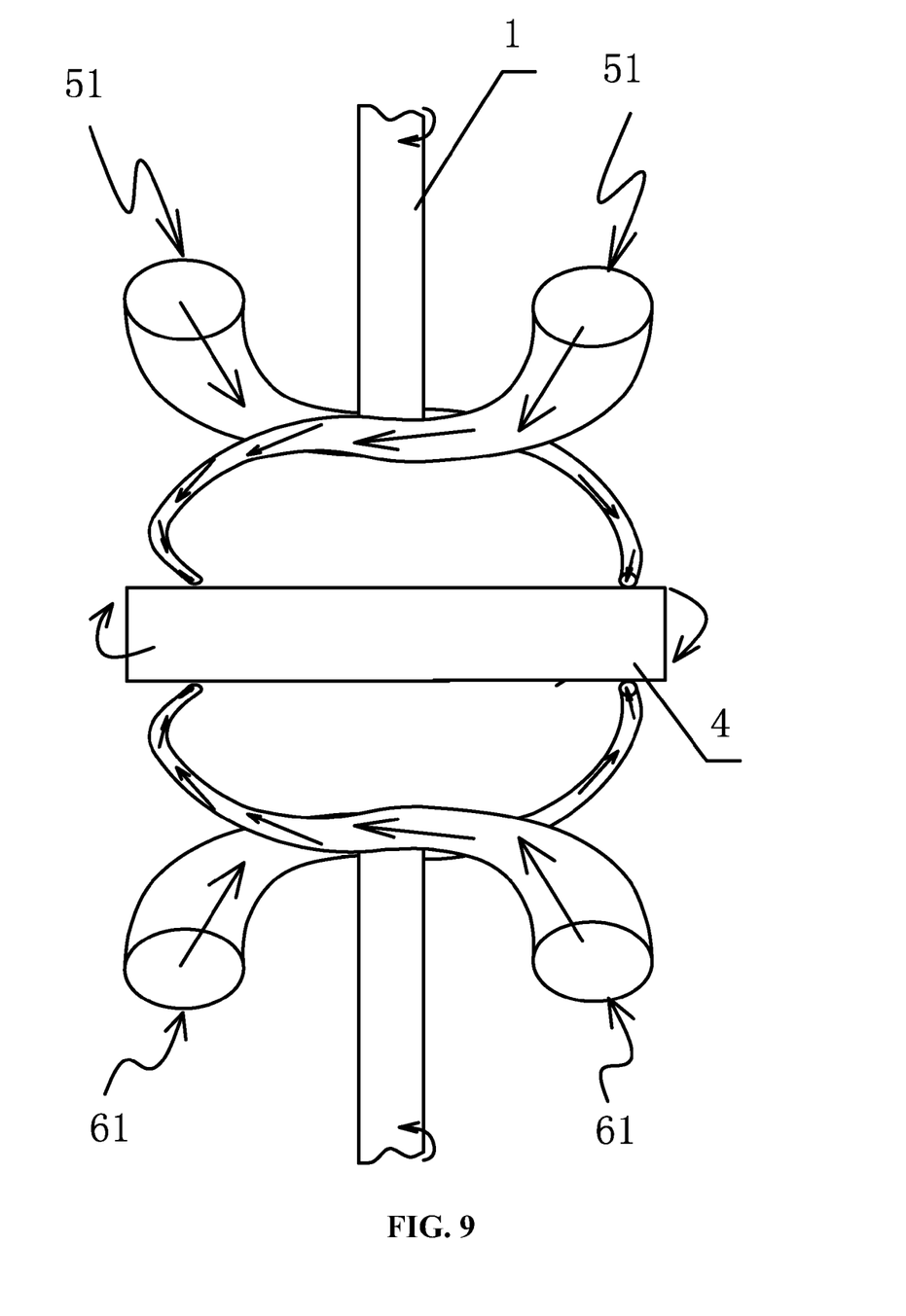
FIG. 9 is a diagram illustrating operation principle of the second embodiment of the invention.

As shown in FIGS. 8 and 9, in a second embodiment of the invention, a pair of water channels 51 disposed on the hydraulic accelerator 5, and a water inlet 52 and a water outlet 53 corresponding to the water channels 51 further improve transformation efficiency. Meanwhile, a pair of channels 61 disposed on the second hydraulic accelerator 6, and a second water inlet 62 and a second water outlet 63 corresponding to the channel 61 further improves transformation efficiency. The rotating shaft 1 is rotably connected to the hydraulic accelerator 5 and the second hydraulic accelerator 6, a positioning bulge 11 is disposed on the rotating shaft 1 and operates to prevent the hydraulic accelerator 5 and the second hydraulic accelerator 6 from axially moving. Thus during operation, the rotating shaft 1 can rotate with respect to the hydraulic accelerator 5 and the second hydraulic accelerator 6, and at the same time, drive the hydraulic accelerator 5 and the second hydraulic accelerator 6 to move upwards and downwards. Multiple stop plates 64 are disposed on periphery of the hydraulic accelerator 5 and the second hydraulic accelerator 6. In the second embodiment, except for adding the water channels 51 or the channels 61, multiple groups of hydraulic accelerators 5 are disposed at the bottom of the rotating shaft 1 at a certain interval. Power generating mechanism (not shown) formed by the water wheel 4 and the second hydraulic accelerator 6 greatly improves transformation efficiency of the invention.

Figure 10:
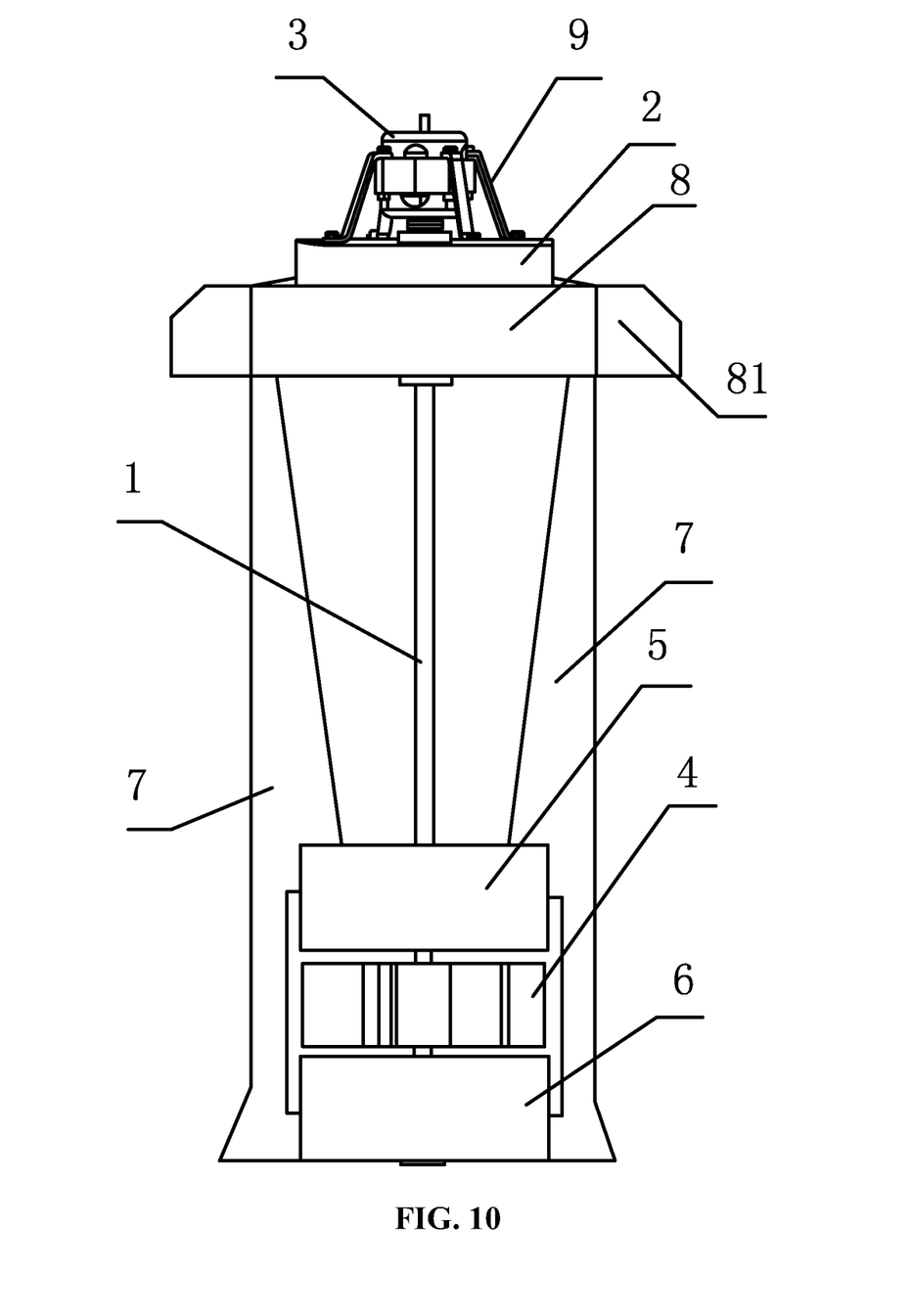
FIG. 10 is a front view of a third embodiment of the invention.

As shown in FIG. 10, in a third embodiment of the invention, one or more water channels can be disposed on the hydraulic accelerator 5 and the second hydraulic accelerator 6 (not shown). The rotating shaft 1 passes through the hydraulic accelerator 5 and the second hydraulic accelerator 6, and is capable of rotating. The hydraulic accelerator 5 and the second hydraulic accelerator 6 are fixedly connected to the water receiver 8 via a connecting sheet 7. Since a vertical plate 81 disposed on periphery of the water receiver 8 blocks, the hydraulic accelerator 5 and the second hydraulic accelerator 6 cannot rotate, which prevents rotation of the hydraulic accelerator 5 and the second hydraulic accelerator 6 from affecting transformation efficiency.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. An ocean wave power device, comprising
a floating body (2);
an electric generator (3);
multiple water wheels (4); and
a hydraulic accelerator (5);
wherein
said electric generator (3) is fixed on said floating body (2);
a rotating shaft (1) is disposed between said hydraulic accelerator (5) and said floating body (2), and capable of rotating with respect to said floating body (2) and said hydraulic accelerator (5);
the top of said rotating shaft (1) passes through said floating body (2) and is connected to a rotor of said electric generator (3);
the bottom of said rotating shaft (1) passes through said hydraulic accelerator (5) and is fixedly connected to said water wheels (4); and
a water channel (51) is disposed on said hydraulic accelerator (5), and operates to form high-speed flow whereby driving said water wheels (4) to rotate in the same direction.
2. The ocean wave power device of claim 1, wherein
said water channel (51) is helical; and
inner diameter of said water channel (51) gradually reduces from an inlet end to an outlet end thereof.
3. The ocean wave power device of claim 1, wherein
said hydraulic accelerator (5) is disposed above said water wheels (4);

said inlet end of said water channel (51) forms a water inlet (52) on upper end surface of said hydraulic accelerator (5);
said outlet end of said water channel (51) forms a water outlet (53) on lower end surface of said hydraulic accelerator (5);
said water outlet (53) deviates from the center of said hydraulic accelerator (5); and
said water inlet (52) is much bigger than said water outlet (53).
4. The ocean wave power device of claim 3, wherein
a second hydraulic accelerator (6) is disposed below said water wheels (4);
the bottom of said rotating shaft (1) extends downwards and passes through said second hydraulic accelerator (6); and
a channel (61) is disposed on said second hydraulic accelerator (6) and operates to form high-speed flow whereby driving said water wheels (4) to rotate in the same direction.
5. The ocean wave power device of claim 4, wherein
said channel (61) is helical;
inner diameter of said channel (61) gradually reduces from an inlet end to an outlet end thereof;
an inlet end of said channel (61) forms a second water inlet (62) on lower end surface of said second hydraulic accelerator (6);
an outlet end of said channel (61) forms a second water outlet (63) on upper end surface of said second hydraulic accelerator (6);
said second water outlet (63) deviates from the center of said second hydraulic accelerator (6); and
said second water inlet (62) is much larger than said second water outlet (63).
6. The ocean wave power device of claim 5, wherein
said rotating shaft (1) is rotably connected to said hydraulic accelerator (5) and said second hydraulic accelerator (6);
a positioning bulge (11) is disposed on said rotating shaft (1) and operates to prevent said hydraulic accelerator (5) and said second hydraulic accelerator (6) from axially moving; and
a pair of stop plates (64) is disposed on periphery of said hydraulic accelerator (5) and said second hydraulic accelerator (6), and operates to prevent rotation thereof.
7. The ocean wave power device of claim 5, wherein
a water receiver (8) with an upward opening is disposed at the bottom of said floating body (2);
said water receiver (8) is fixedly connected to said floating body (2);
a vertical plate (81) is disposed on periphery of said water receiver (8);
said rotating shaft (1) passes through said hydraulic accelerator (5) and said second hydraulic accelerator (6), and is capable of rotating; and
said hydraulic accelerator (5) and said second hydraulic accelerator (6) are fixedly connected to said water receiver (8) via a connecting sheet (7).
8. The ocean wave power device of claim 7, wherein
said floating body (2) floats on water surface;
said floating body (2) comprises an upper clamping plate (21), a lower clamping plate (23), and a floating pan (22) disposed between said upper clamping plate (21) and said lower clamping plate (23);
said upper clamping plate (21), said lower clamping plate (23), and said floating pan (22) are fixedly connected altogether;

multiple connecting plates (24) are disposed at the bottom of said lower clamping plate (23); and the bottom of said connecting plate (24) is fixedly connected to the bottom of said water receiver (8).

9. The ocean wave power device of claim 1, wherein multiple blades (41) are uniformly distributed on periphery of said water wheels (4); and said blade (41) is a smooth and arc-shaped sheet.

\* \* \* \* \*